(12) United States Patent
Burd et al.

(10) Patent No.: US 11,143,030 B2
(45) Date of Patent: Oct. 12, 2021

(54) COATING PROCESS FOR GAS TURBINE ENGINE COMPONENT WITH COOLING HOLES

(71) Applicant: United Technologies Corporation, Hartford, CT (US)

(72) Inventors: Steven W. Burd, Cheshire, CT (US); Alan C. Barron, Jupiter, FL (US)

(73) Assignee: Raytheon Technologies Corporation, Farmington, CT (US)

( * ) Notice: Subject to any disclaimer, the term of this patent is extended or adjusted under 35 U.S.C. 154(b) by 1934 days.

(21) Appl. No.: 13/725,229

(22) Filed: Dec. 21, 2012

(65) Prior Publication Data

US 2014/0255158 A1  Sep. 11, 2014

(51) Int. Cl.
| | |
|---|---|
| *C23C 28/00* | (2006.01) |
| *C23C 4/18* | (2006.01) |
| *F01D 5/00* | (2006.01) |
| *F01D 5/28* | (2006.01) |
| *C23C 4/02* | (2006.01) |
| *C23C 4/01* | (2016.01) |
| *B23P 6/00* | (2006.01) |
| *F01D 5/18* | (2006.01) |

(52) U.S. Cl.
CPC .............. *F01D 5/005* (2013.01); *B23P 6/00* (2013.01); *C23C 4/01* (2016.01); *C23C 4/02* (2013.01); *C23C 4/18* (2013.01); *C23C 28/321* (2013.01); *C23C 28/34* (2013.01); *F01D 5/186* (2013.01); *F01D 5/187* (2013.01); *F01D 5/288* (2013.01); *B23P 2700/06* (2013.01); *F05D 2230/90* (2013.01); *Y02T 50/60* (2013.01)

(58) Field of Classification Search
CPC ......... C23C 28/027; C23C 28/34; C23C 4/02; C23C 28/321; C23C 4/18; C23C 4/01; B23P 6/00; B23P 2700/06; F01D 5/005; F01D 5/288; F01D 5/186; F01D 5/187; Y02T 50/60; F05D 2230/90
USPC ................................................. 427/140, 142
See application file for complete search history.

(56) References Cited

U.S. PATENT DOCUMENTS

| | | | |
|---|---|---|---|
| 5,392,515 A | 2/1995 | Auxier et al. | |
| 5,702,288 A | 12/1997 | Liebke et al. | |
| 6,074,706 A | 6/2000 | Beverly et al. | |
| 6,183,811 B1 | 2/2001 | Conner | |
| 6,265,022 B1 | 7/2001 | Fernihough | |
| 6,365,013 B1 | 4/2002 | Beele | |
| 6,380,512 B1 | 4/2002 | Emer | |
| 6,667,076 B2 * | 12/2003 | Fried ......................... | C23C 4/00 29/889.721 |
| 7,614,235 B2 | 11/2009 | Burd et al. | |
| 7,622,160 B2 * | 11/2009 | Gupta ..................... | C23C 4/073 427/446 |

(Continued)

OTHER PUBLICATIONS

Search report for EP13865400.9 dated Dec. 14, 2015.

(Continued)

*Primary Examiner* — Dah-Wei D. Yuan
*Assistant Examiner* — Nga Leung V Law
(74) *Attorney, Agent, or Firm* — Getz Balich LLC

(57) ABSTRACT

A method of coating a component having a multiple of cooling holes includes removing at least a portion of a prior coating; directing a gas through at least one of the multiple of cooling holes; and applying a coat layer while directing the gas through at least one of the

11 Claims, 6 Drawing Sheets

(56) References Cited

U.S. PATENT DOCUMENTS

| | | |
|---|---|---|
| 7,631,502 B2 | 12/2009 | Burd et al. |
| 7,985,188 B2 | 7/2011 | Felts et al. |
| 8,192,831 B2 | 6/2012 | Rosenzweig et al. |
| 2003/0165621 A1 | 9/2003 | Farmer et al. |
| 2003/0231955 A1 | 12/2003 | Barry et al. |
| 2004/0134897 A1 | 7/2004 | Das et al. |
| 2008/0085395 A1* | 4/2008 | Fernihough ............ B23P 6/007 428/131 |
| 2009/0014254 A1 | 1/2009 | Finschi |
| 2009/0142548 A1 | 6/2009 | Patterson |
| 2009/0270014 A1 | 10/2009 | Miller et al. |
| 2010/0126014 A1* | 5/2010 | Gupta .................... B23P 6/007 29/889.1 |
| 2012/0084981 A1 | 4/2012 | Arikawa et al. |

OTHER PUBLICATIONS

International search report for PCT/US2013/075698 dated Apr. 11, 2014.
EP office action for EP13865400.9 dated Dec. 22, 2019.

* cited by examiner

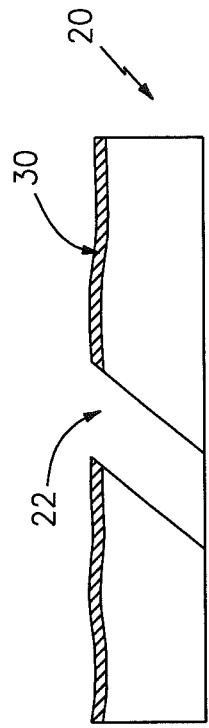
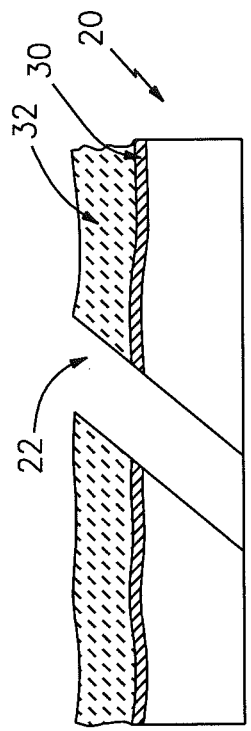
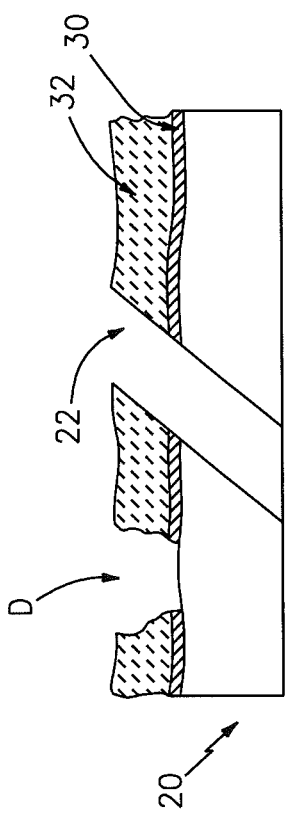
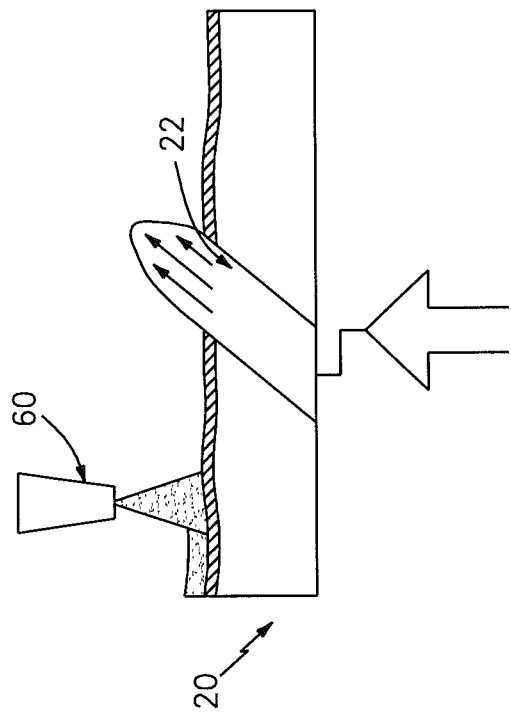

COATING PROCESS FOR GAS TURBINE ENGINE COMPONENT WITH COOLING HOLES

BACKGROUND

The present disclosure relates generally to a coating process and, more particularly, to a coating process for air-cooled components.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Gas turbine engine hot section components such as blades and vanes are subject to high thermal loads for prolonged time periods. Other components also experience high thermal loads such as combustor, exhaust liner and nozzle components. Historically, such components have implemented various air-cooling arrangements within numerous cooling holes that permit the passage of air sourced from the compressor or fan section. In addition, the components are typically provided with various coatings such as a thermal barrier coating to further resist the thermal loads.

Over time, the coatings may wear. To restore these components to near-original capability, common repair practices involve stripping the coating with a water jet and re-performing the coating operation. These repairs are typically neither cost-effective nor operationally effective as the original cooling holes cannot be properly located due to recoat coverage within and over the cooling holes. This recoat coverage may result in a secondary complication in that the cooling holes cannot be readily located for restoration as re-drill operations typically result in misaligned or duplicate cooling holes.

SUMMARY

A method of coating a component having a multiple of cooling holes, according to one disclosed non-limiting embodiment of the present disclosure includes removing at least a portion of a prior coating, directing a gas through at least one of the multiple of cooling holes, and applying a coat layer while directing the gas through at least one of the multiple of cooling holes.

In a further embodiment of the foregoing embodiment, the method includes removing all layers of a top coat of the prior coating.

In a further embodiment of any of the foregoing embodiments, the method includes removing all layers of a ceramic top coat of the prior coating. In the alternative or additionally thereto, the foregoing embodiment includes removing at least one layer of a nickel alloy bond coat of the prior coating.

In a further embodiment of any of the foregoing embodiments, the method includes removing all layers of a ceramic top coat of the prior coating and at least one layer of the prior coating.

In a further embodiment of any of the foregoing embodiments, the method includes directing air through at least one of the multiple of cooling holes.

In a further embodiment of any of the foregoing embodiments, the method includes applying one coat layer without directing the gas through at least one of the multiple of cooling holes.

In a further embodiment of any of the foregoing embodiments, the method includes directing air through at least one of the multiple of cooling holes at a pressure between 10-200 psi.

In a further embodiment of any of the foregoing embodiments, the method includes directing air through at least one of the multiple of cooling holes at a pressure of approximately 100 psi.

In a further embodiment of any of the foregoing embodiments, the method includes mapping the multiple of cooling holes. In the alternative or additionally thereto, the foregoing embodiment includes finish drilling the multiple of cooling holes.

In a further embodiment of any of the foregoing embodiments, the method includes cleaning the multiple of cooling holes.

In a further embodiment of any of the foregoing embodiments, the method includes dressing the multiple of cooling holes to obtain a desired flow quality.

A method of manufacturing a component having a multiple of cooling holes, according to another disclosed non-limiting embodiment of the present disclosure includes directing a gas through at least one of the multiple of cooling holes and applying a coat layer while directing the gas through at least one of the multiple of cooling holes.

In a further embodiment of the foregoing embodiment, the method includes directing air through at least one of the multiple of cooling holes.

In a further embodiment of any of the foregoing embodiments, the method includes applying one coat layer without directing the gas through at least one of the multiple of cooling holes.

In a further embodiment of any of the foregoing embodiments, the method includes cleaning the multiple of cooling holes.

A repaired component having a multiple of cooling holes, according to another disclosed non-limiting embodiment of the present disclosure includes a component with a multiple of cooling holes and a repaired area with a prior coating and a newly applied coating.

In a further embodiment of the foregoing embodiment, the prior coating includes at least one layer of a bond coat.

In a further embodiment of any of the foregoing embodiments, at least one of the multiple of cooling holes are within the repaired area.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 2 is an expanded cross section of the actively cooled component;

FIG. 4 is an expanded cross section of the actively cooled component representative of one step of the method of repairing an actively cooled component;

FIG. 7 is an expanded cross section of the actively cooled component representative of one step of the method of repairing an actively cooled component;

FIG. 8 is an expanded cross section of the actively cooled component representative of one step of the method of repairing an actively cooled component;

DETAILED DESCRIPTION

Figure 1:
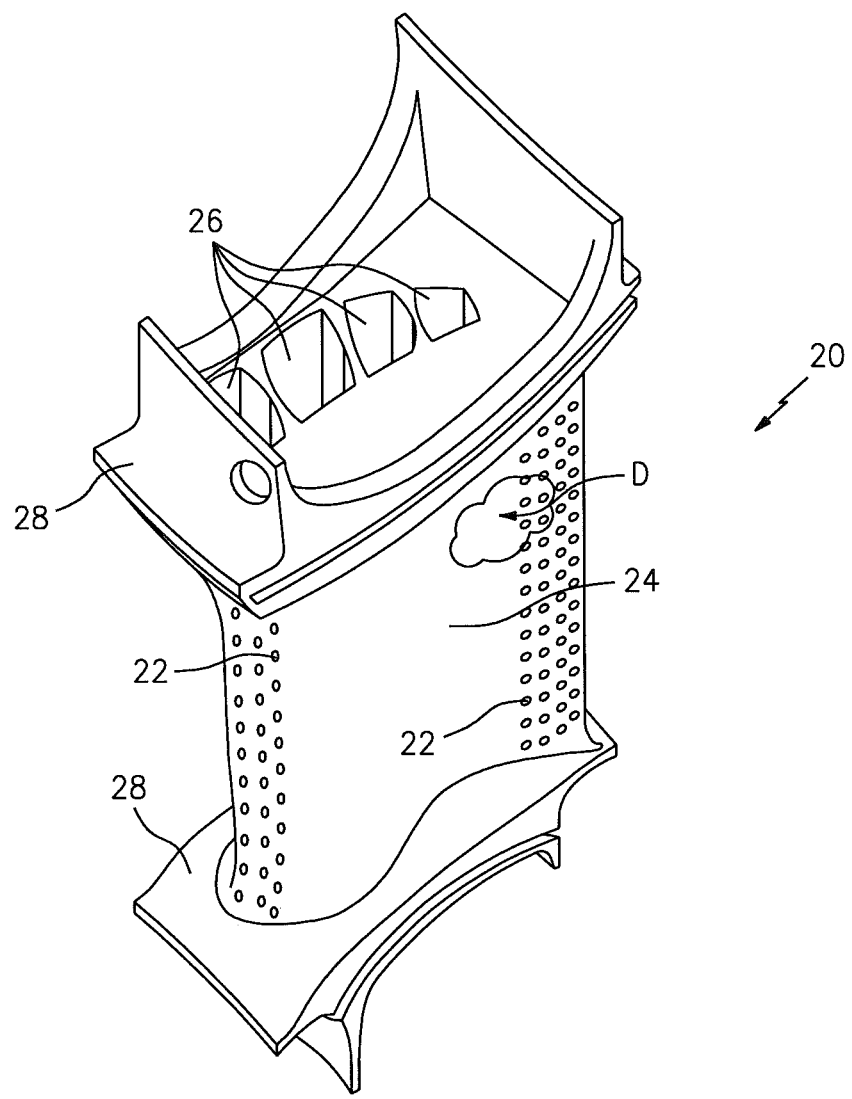
FIG. 1 is a general schematic view of an exemplary actively cooled component as a representative workpiece.

FIG. 1 schematically illustrates a general perspective view of an exemplary component 20, e.g., an actively cooled turbine stator segment of a gas turbine engine. It should be understood that although a particular component type is illustrated in the disclosed non-limiting embodiment, other components, such as blades, vanes, exhaust duct liners, nozzle flaps nozzle seals as well as other actively cooled components will also benefit herefrom. These components operate in challenging high-temperature environments such as a hot section of a gas turbine engine and have aggressive requirements in terms of durability and temperature allowances.

The stator 20 includes a multiple of cooling holes 22 in an airfoil section 24 that communicate with internal passageways 26 (shown schematically in phantom) that extend through the stator platforms 28. The cooling holes 22, film or effusion, may be formed with lasers, Electron Discharge Machining (EDM), water jet or other techniques and are typically approximately 0.020-0.125 inches (0.5-3.2 mm) in diameter and may be drilled normal or angled to the surface. Cooling air enters the internal passageways 26 of the component 20 through the internal passageways 26. The cooling holes 22, provide cooling to the exposed surface of the components to reduce temperatures and heat transfer. For example, the internal passageways 26 of the component 20 are cooled by convection while the outer surface is cooled through film cooling from air that exits the cooling holes 22.

Flow path surfaces such as the airfoil section 24 and the associated surfaces of the stator platforms 28 are coated to provide thermal barrier, environmental barriers and/or other capabilities required to survive in the high-temperature environment or to meet requirements. The coating may be a thermal barrier coating that includes a bond coat 30 and a top coat 32 (FIG. 2). The bond coat 30 in one disclosed non-limiting embodiment may be a nickel-based alloy material and the top coat 32 may be a ceramic material, each typically applied in layers via plasma spray coating system. The top coat 32 is typically thicker than the bond coat 30.

With reference to FIG. 2, the coating, over time, may become distressed in particular areas (illustrated schematically at D). The distressed areas D may include spallation or liberation of the coating—typically the top coat 32 flakes away from the bond coat 30.

Figure 3:
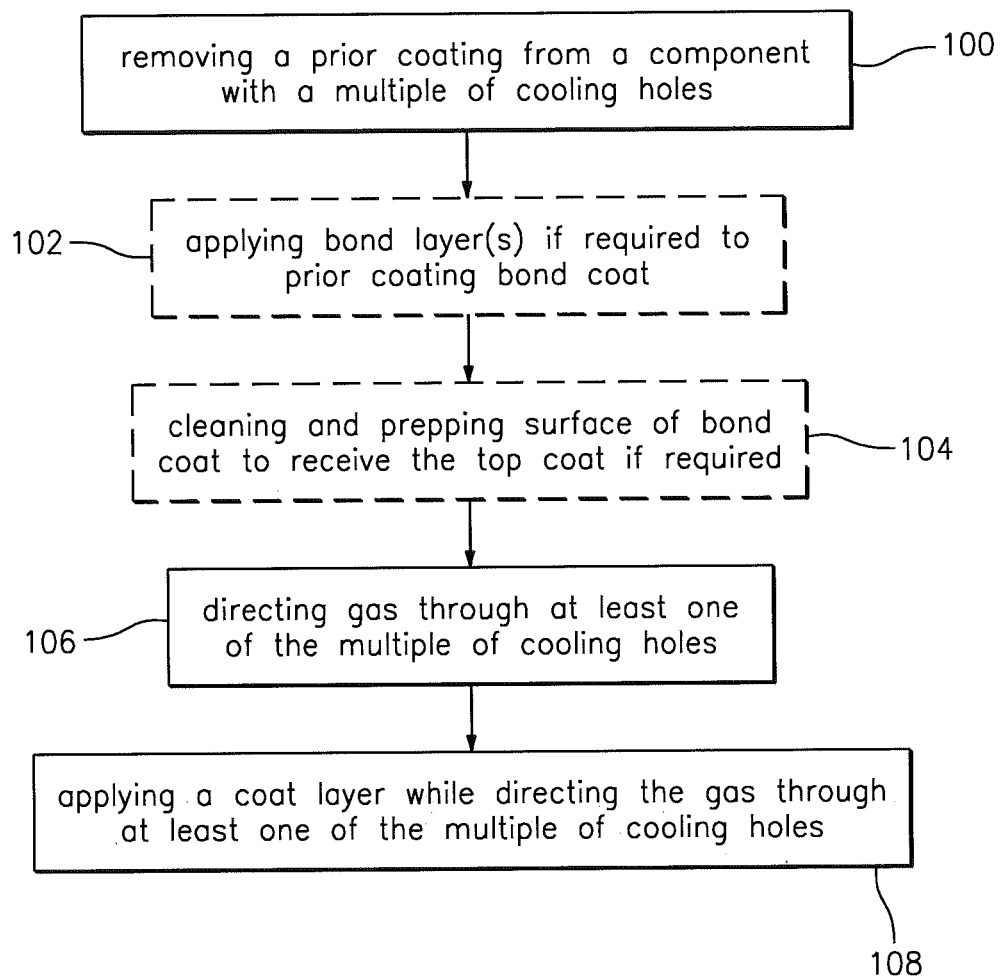
FIG. 3 is a flow diagram of a method of repairing an actively cooled component according to one disclosed non-liming embodiment.

With reference to FIG. 3, to restore the component 20 to near-original capability, an aftermarket repair method for the coating involves stripping the top coat 32 in the distressed areas D with a water jet, grit blast or other system (FIG. 4; Step 100). The top coat 32 and a portion of the bond coat 30 may be removed. That is, the top coat 32 and the bond coat 30 are typically applied in sprayed layers such that all layers of the top coat 32 are removed and one or more of the layers of bond coat 30 are removed in a repaired area. Alternatively, the entire top coat 32 is removed from the bond coat 30. Alternatively, still, the top coat 32 and the bond coat 30 may be removed.

The removed layer(s) of bond coat 30 may then be reapplied if necessary to bring the thickness of the bond coat 30 to specification (Step 102). The bond coat 30 is relatively thin and reapplication thereof minimally effects, if at all, the multiple of cooling holes 22. The component 20 may then be cleaned and prepped if required to receive the top coat (Step 104).

The component 20 is then positioned to receive a gas such as air, nitrogen or other inert gas through at least one of the multiple of cooling holes 22 (Step 106). In one disclosed non-limiting embodiment, the gas is "shop air" at a pressure between 10-200 psi and more specifically at approximately 100 psi. "Shop air" as defined herein is air typically available in a manufacturing and repair environment. Other pressures, gases and fluids may alternatively be provided dependent on, for example, the coating and application system.

Figure 5:
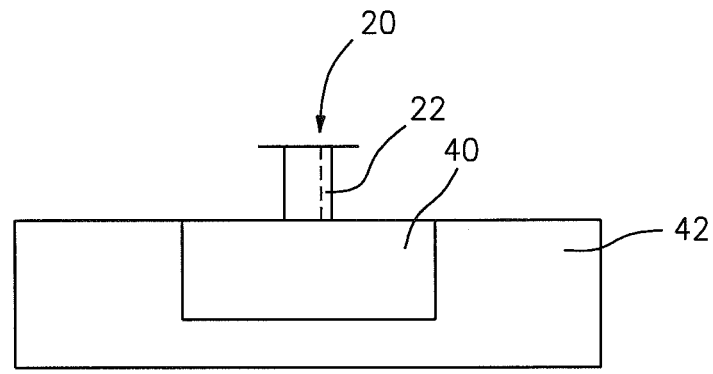
FIG. 5 is a schematic representation of one step of the method in which the component is positioned to receive a gas through at least one of the multiple of cooling holes during coating according to another disclosed non-liming embodiment.
Figure 6:
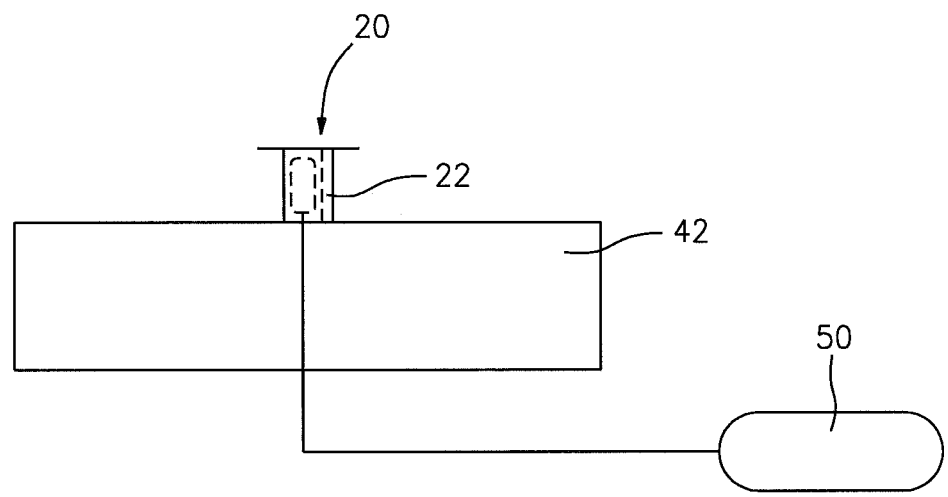
FIG. 6 is a schematic representation of one step of the method in which the component is positioned to receive a gas through at least one of the multiple of cooling holes during coating according to another disclosed non-liming embodiment.

In one disclosed non-limiting embodiment, the component 20 is affixed to a pressurized, sealed plenum 40 that mounted to a coating fixture 42 to permit flow from the uncoated surface of the component 20 and out through the cooling holes 22 (FIG. 5). In another disclosed non-limiting embodiment, the component 20 is connected to a bladder 50 in communication with the internal passageways 26 in the component 20 (FIG. 6). The bladder 50 is then pressurized to force gas flow through the cooling holes 22. It should be understood that other systems to force the gas through the cooling holes 22 may alternatively or additionally be provided.

While the gas is directed through at least one of the multiple of cooling holes 22, the top coat 32 is reapplied with a spray system 60 (illustrated schematically; FIG. 7) such as, for example, a plasma spray system (step 108). The gas flow through the cooling holes 22 during coating application prevents or minimizes the adhesion of the coating in the air path from the cooling holes 22 due to the momentum of the gas and the quenching nature of the gas interaction with the coating to form the cooling hole 22 in an ablative manner (FIG. 8).

Figure 9:
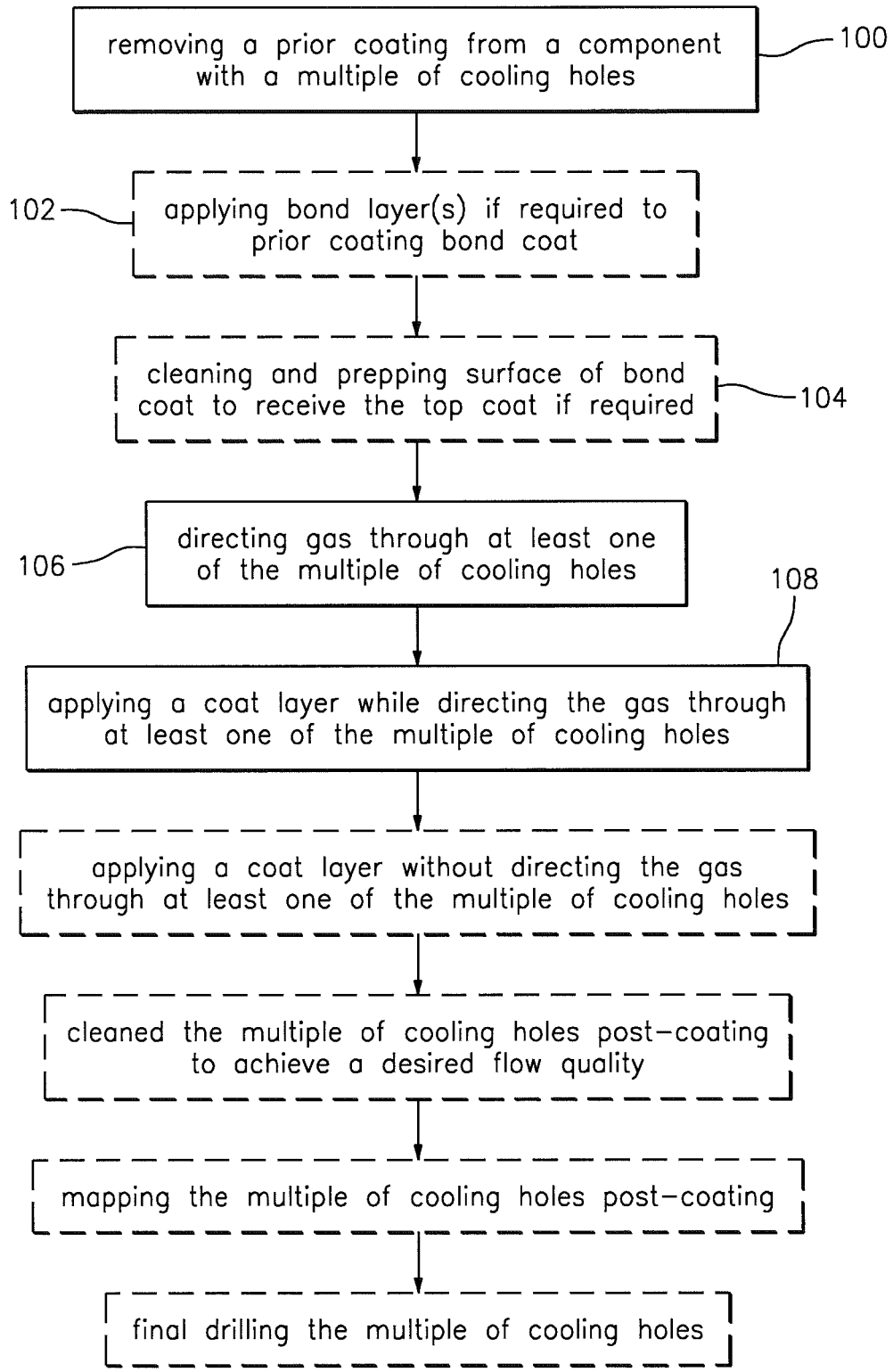
FIG. 9 is a flow diagram of a method of repairing an actively cooled component according to another disclosed non-liming embodiment.
Figure 10:
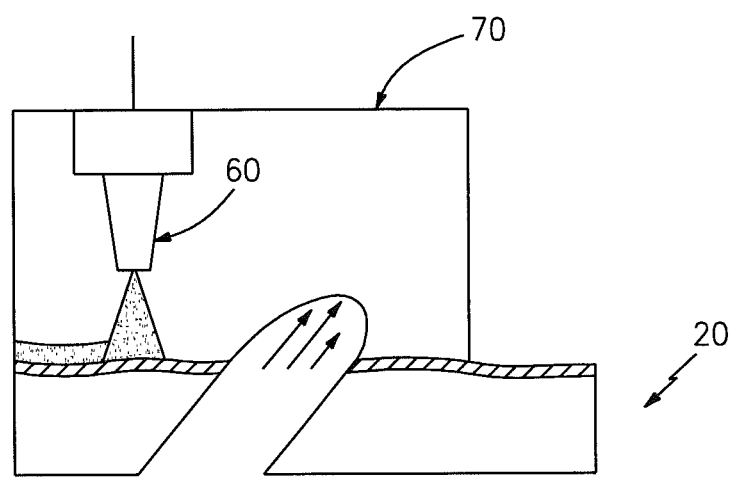
FIG. 10 is an expanded cross section of the actively cooled component representative of one step of the method of repairing an actively cooled component.

With reference to FIG. 9, a method according to another disclosed non-limiting embodiment turns the gas flow through the cooling holes 22 during the coating step off, for example, during initial or final layers of top coat 32 application (step 110). That is, one or more top coat 32 layer applications may be relatively thin and reapplication thereof minimally effects, if at all, the multiple of cooling holes 22. In another disclosed non-limiting embodiment, the spray system 60 is within a vacuum environment 70 (illustrated schematically) which may ride along or is otherwise attached on the coated side of the component 20 and, thus, draws air through the component 20 (FIG. 10).

The cooling holes 22 may then be cleaned and dressed post-coating (step 112) to achieve a desired flow quality, assure that the cooling holes 22 are not filled with extraneous coating matter or to accommodate the wake effect of the gas flow that may change the coating characteristics on the acute angle side of the cooling holes 22. That is, the coating adjacent to the cooling holes 22 is ablated and may require finish drilling In another disclosed non-limiting embodiment, the above-described method may be coupled with mapping or scanning techniques to more precisely identify the cooling holes 22 that are produced. The cooling holes 22 may then be finished drilled (step 114). That is, even if the cooling holes 22 are not to desired specifications, the cooling holes 22 still extend through the surface and are thus readily identifiable and readily finished to the desired specifications without the potential for misalignment or duplication. For further understanding of other aspects of the mapping process, attention is directed to U.S. patent application Ser. No. 8,962,066, which is assigned to the assignee of the instant disclosure and which is hereby incorporated herein in its entirety.

Furthermore, the above-described method may be utilized in the original equipment process as well where the disclosed process forms the hole geometry through a newly applied coating in place of laser, Electron Discharge Machining (EDM), waterjet or other drilling processes. In this non-limiting embodiment, the substrate requires pre-drilled holes that are continued through the coating during application with the above-described method.

It should be understood that relative positional terms such as "forward," "aft," "upper," "lower," "above," "below," and the like are with reference to the engine but should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of coating a component having a multiple of cooling holes comprising:
   removing at least a portion of a prior coating from the component;
   directing a gas through at least one of the multiple of cooling holes, wherein the at least one of the multiple of cooling holes extends in the component to an outlet; and
   applying a coat layer onto a surface of the component, wherein the coat layer is contiguous with the outlet on a side of the at least one of the multiple of cooling holes, wherein a centerline of the at least one of the multiple of cooling holes is angularly offset from the surface on the side by an acute angle, and wherein the gas is directed through the at least one of the multiple of cooling holes before and during the applying of the coat layer onto a portion of the surface of the component adjacent the outlet.

2. The method as recited in claim 1, further comprising removing all layers of a top coat of the prior coating.

3. The method as recited in claim 1, further comprising removing all layers of a ceramic top coat of the prior coating.

4. The method as recited in claim 3, further comprising removing at least one layer of a nickel alloy bond coat of the prior coating.

5. The method as recited in claim 1, further comprising removing all layers of a ceramic top coat of the prior coating and at least one layer of the prior coating.

6. The method as recited in claim 1, further comprising directing air through at least one of the multiple of cooling holes.

7. The method as recited in claim 1, further comprising applying one coat layer without directing the gas through at least one of the multiple of cooling holes.

8. The method as recited in claim 1, further comprising mapping the multiple of cooling holes.

9. The method as recited in claim 8, further comprising finish drilling the multiple of cooling holes.

10. The method as recited in claim 1, further comprising cleaning the multiple of cooling holes.

11. The method as recited in claim 1, further comprising dressing the multiple of cooling holes to obtain a desired flow quality.

* * * * *